US012780320B2

(12) United States Patent
Kim et al.

(10) Patent No.: US 12,780,320 B2
(45) Date of Patent: Nov. 3, 2026

(54) VEHICLE ROOF MODULE

(71) Applicants: Hyundai Motor Company, Seoul (KR); Kia Corporation, Seoul (KR); HYUNDAI MOBIS CO., LTD., Seoul (KR)

(72) Inventors: Do Hoi Kim, Sejong-Si (KR); Keon Chul Lee, Yongin-Si (KR); Won Jung Song, Seoul (KR); Suk Joo Hong, Suwon-Si (KR); Sun Hyung Cho, Suwon-Si (KR); Ju Chul Kim, Ulsan (KR); Tae Ou Park, Seongnam-Si (KR); Jang Ho Kim, Seoul (KR)

(73) Assignees: Hyundai Motor Company, Seoul (KR); Kia Corporation, Seoul (KR); HYUNDAI MOBIS CO., LTD., Seoul (KR)

( * ) Notice: Subject to any disclaimer, the term of this patent is extended or adjusted under 35 U.S.C. 154(b) by 342 days.

(21) Appl. No.: 18/387,783

(22) Filed: Nov. 7, 2023

(65) Prior Publication Data

US 2024/0326921 A1 Oct. 3, 2024

(30) Foreign Application Priority Data

Mar. 27, 2023 (KR) ........................ 10-2023-0039948

(51) Int. Cl.
*B62D 25/06* (2006.01)
*B60R 21/00* (2006.01)
*B60R 21/02* (2006.01)

(52) U.S. Cl.
CPC .............. *B62D 25/06* (2013.01); *B60R 21/02* (2013.01); *B60R 2021/0006* (2013.01); *B60R 2021/0253* (2013.01)

(58) Field of Classification Search
CPC ...... B62D 25/06; B62D 27/265; B60R 21/15; B60R 21/152; B60R 21/157; B60R 21/02;
(Continued)

(56) References Cited

U.S. PATENT DOCUMENTS 3,833,254 A * 9/1974 Renner .................. B62D 25/06
296/210

FOREIGN PATENT DOCUMENTS

| | | | |
|---|---|---|---|
| DE | 3420781 | * | 1/1985 |
| KR | 10-2015-0104269 | | 9/2015 |
| KR | 10-2023-0067148 | | 5/2023 |

OTHER PUBLICATIONS

DE3420781 Text Year 1985 (Year: 1985).*

* cited by examiner

*Primary Examiner* — Amy R Weisberg
(74) *Attorney, Agent, or Firm* — MORGAN, LEWIS & BOCKIUS LLP

(57) ABSTRACT

A vehicle roof module includes a front support portion extending in the width direction of the vehicle and connecting the upper bodies of the vehicle with each other, a rear support portion extending in the width direction of the vehicle and provided at a rear of the front support portion, and a reinforcing support portion connecting the front support portion and the rear support portion in a longitudinal direction of the vehicle and including an internal pattern, in which the front support portion, the rear support portion, the reinforcing support portion, and the upper bodies of the vehicle are connected to each other to form a load path for a vehicle collision along the internal pattern of the reinforcing support portion.

18 Claims, 9 Drawing Sheets

(58) Field of Classification Search
CPC ........ B60R 2021/006; B60R 2021/004; B60R 2021/0018; B60R 2021/0023
USPC ..... 296/210, 23.01, 3, 191, 187.12, 9, 1, 29, 296/30
See application file for complete search history.

VEHICLE ROOF MODULE

CROSS REFERENCE TO RELATED APPLICATION

The present application claims priority to Korean Patent Application No. 10-2023-0039948, filed on Mar. 27, 2023, the entire contents of which is incorporated herein for all purposes by this reference.

BACKGROUND OF THE PRESENT DISCLOSURE

Field of the Present Disclosure

The present disclosure relates to a vehicle roof module, and more particularly, to a vehicle roof module for implementing a more effective load path by distributing a load from a vehicle collision with an external object through an internal pattern formed in a reinforcing support portion in an upper body structure of a vehicle that implements a load path for a vehicle collision with an external object.

Description of Related Art

Conventional steel body-in-white (BIW) upper body frames typically have separate cross-sections for the roof, side, windshield, and lead section openings, with partially open cross-sections for the members of the openings. In other words, in the conventional structure, the A-pillar and roof side members are disconnected as when they are cut off at the ends and connected to other members at the disconnected ends.

The openings and open cross-sectional structure of the upper body parts not only pose challenges in securing body rigidity, roof strength, and durability but also pose a problem that forming a closed cross-sectional structure requires an increase in the number of parts, which leads to an assembly problem.

Furthermore, it is common to assemble two upper and lower open cross-sections into a closed cross-section when forming steel open cross-sections or when high ceiling strength is required. However, for electric vehicles without B-pillars, it is essential to distribute the load in the event of a collision, but conventional upper body frames have difficulty in accommodating this.

Accordingly, a solution is needed to implement multiple load paths for a vehicle collision in the upper body structure of a vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle roof module that implements a more effective load path by distributing the load from a vehicle collision through an internal pattern formed in a reinforcing support portion in the upper body structure of the vehicle and increases the overall strength of the roof module by employing a distinctive method of coupling with the upper body.

The present disclosure presents a solution to the technical challenges described above by providing a vehicle roof module that includes a front support portion extending in the width direction of the vehicle and connecting the upper bodies of the vehicle to each other, a rear support portion extending in the width direction of the vehicle and provided at a rear of the front support portion, and a reinforcing support portion connecting the front support portion and the rear support portion in a longitudinal direction of the vehicle and including an internal pattern, in which the front support portion, the rear support portion, the reinforcing support portion, and the upper bodies of the vehicle are connected to each other to form a load path for a vehicle collision along the internal pattern of the reinforcing support portion.

For example, the front support portion and the rear support portion may respectively include an internal space, and a front rail which is inserted into the internal space of the front support portion and extends in the width direction of the vehicle and a rear rail which is inserted into the internal space of the rear support portion and extends in the width direction of the vehicle may be further included.

For example, the front rail and the rear rail may be bolted to the upper body at both end portions in an up and down direction while being inserted into the internal spaces of the front support portion and the rear support portion, respectively.

For example, the front support portion, the rear support portion, and the reinforcing support portion may be made of plastic, and the front rail and the rear rail may be made of steel.

For example, a mounting portion laterally extending may be formed in the reinforcing support portion, and a receiving groove recessed downward may be formed on the upper surface of the upper body so that the mounting portion may be supported in the receiving groove.

For example, the mounting portion may be coupled to the upper body of the vehicle by being bolted in the up and down direction while being supported in the receiving groove.

For example, a plurality of mounting portions may be arranged along the upper body on the sides of the reinforcing support portion at predetermined intervals therebetween.

For example, the mounting portions may be formed so that a width of the mounting portion decreases toward an external side of the vehicle.

For example, the reinforcing support portion may include a plurality of reinforcing ribs, and each reinforcing rib may include a plurality of through holes formed at predetermined intervals to form the internal pattern.

For example, at least one of the plurality of reinforcing ribs may be formed in a curved shape on one side to form a parabolic shape.

For example, the plurality of reinforcing ribs may allow loads to be transferred from the front support portion to the upper body and rear support portion in an event of a frontal collision of the vehicle.

For example, the plurality of reinforcing ribs may allow loads to be transferred from one upper body to another upper body via the front support portion and the rear support portion in the event of a side-impact collision of the vehicle.

For example, a support rib may be formed on the lower surface of the reinforcing support portion, and the support rib may be disposed in a diagonal direction at a point where the front support portion and the upper body are connected.

According to the vehicle roof module of the present disclosure, a more effective load path may be implemented by distributing a load for a vehicle collision through the internal pattern formed on the reinforcing support portion in the structure of the upper body of the vehicle, and the overall strength of the roof module may be increased through a peculiar way of coupling with the upper body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
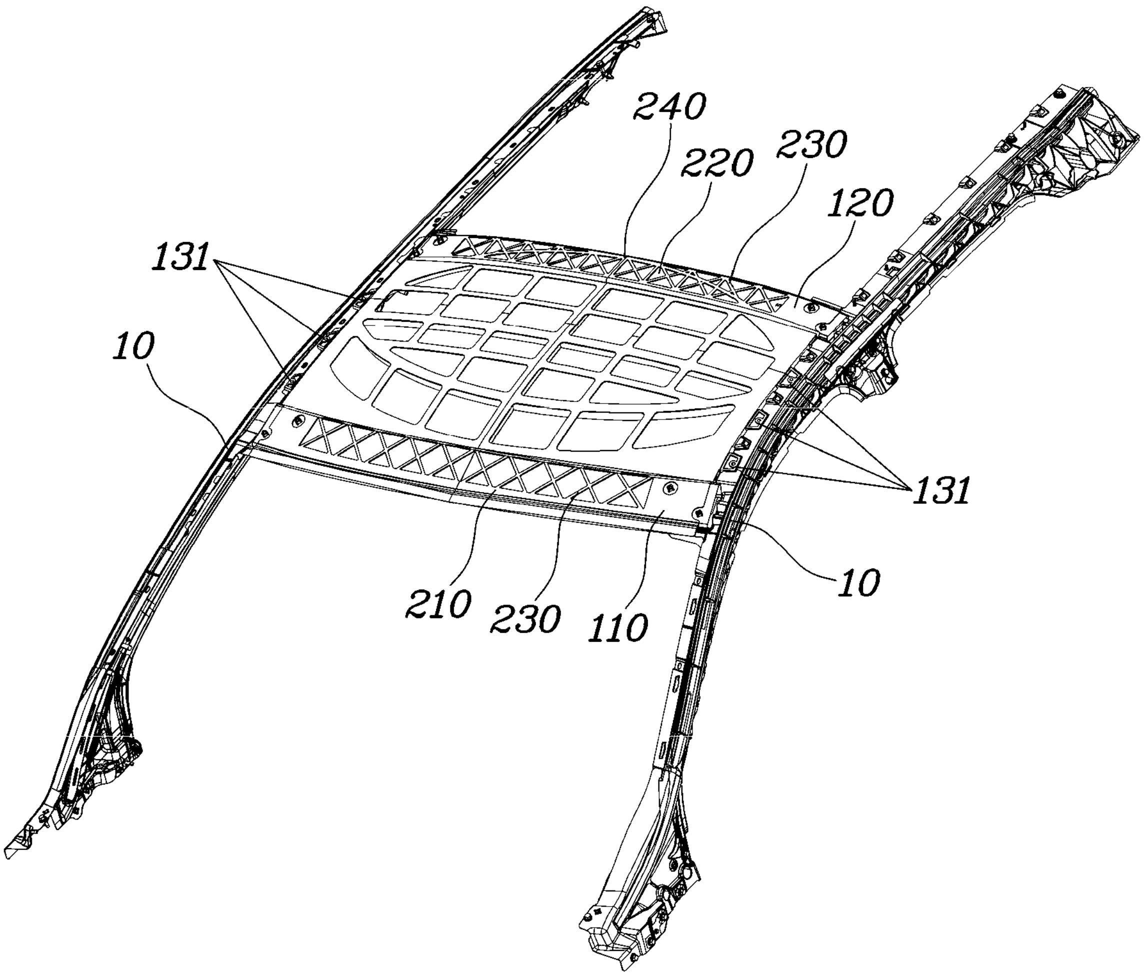
FIG. 1 is a view showing a vehicle roof module according to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The exemplary embodiments included herein will be described in detail with reference to the accompanying drawings. However, the same or similar components will be provided the same reference numerals regardless of the drawing numbers, and the repetitive descriptions regarding these components will be omitted. The suffixes "module" and "unit" for the components used in the following description are provided or interchangeably used only to facilitate the writing of the specification, without necessarily indicating a distinct meaning or role of their own. Furthermore, when it is determined that the specific description of the related and already known technology may obscure the essence of the exemplary embodiments included herein, the specific description will be omitted. Furthermore, it is to be understood that the accompanying drawings are only intended to facilitate understanding of the exemplary embodiments included herein and are not intended to limit the technical ideas included herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

According to various exemplary embodiments of the present disclosure, it is provided to implement multiple load paths for a vehicle collision in the upper body structure of the vehicle.

FIG. 1 is a view showing a vehicle roof module according to various exemplary embodiments of the present disclosure. FIG. 1 highlights components related to the exemplary embodiment of the present disclosure, but the actual implementation of the vehicle roof module may include fewer or more components.

FIG. 1 shows that the vehicle roof module according to the exemplary embodiment of the present disclosure may include a front support portion 110, a rear support portion 120, a reinforcing support portion 130, a front rail 210, and a rear rail 220.

First, the front support portion 110 extends in the width direction of the vehicle and may connect upper bodies 10 on both sides. The front support portion 110 is positioned at the top portion of the windshield of the vehicle and may be the first to receive the load in the event of a frontal collision of the vehicle. Furthermore, the rear support portion 120 extends in the width direction of the vehicle and may connect the upper bodies 10 of the vehicle on both sides at the rear of the front support portion 110. The front support portion 110 and the rear support portion 120 are bent toward the front and rear of the vehicle, respectively, and are connected to the upper bodies 10 of the vehicle on the sides.

Furthermore, the front support portion 110 and the rear support portion 120 respectively include an internal space, and the front rail 210 and the rear rail 220 extend in the width direction of the vehicle and may be inserted into the respective internal space of the front support portion 110 and the rear support portion 120. At the instant time, the front support portion 110, the rear support portion 120, and the reinforcing support portion 130 are made of plastic while the front rail 210 and the rear rail 220 are made of ultra-high strength steel so that the strength of the vehicle body may be ensured. Such a roof module will be referred to as a hybrid-type roof module.

Glass fiber reinforced plastic (GFRP) material may be used in the front support portion 110, the rear support portion 120, and the reinforcing support portion 130 to increase the strength. The hybrid-type roof module including the front rail 210 and the rear rail 220 may be molded by an insert injection method in the internal space of the front support portion 110 and the rear support portion 120 respectively. The front rail 210 and the rear rail 220 include a thickness of 1 mm and are bent according to the vehicle design by 3D computerized numerical control (CNC) bending. As described above, among the manufacturing methods using the 3D CNC bending, the insert injection molding method may be employed to secure the DIM'S of the vehicle roof module, which may increase the overall strength of the roof module.

On the other hand, two reasons for using the hybrid-type roof module will be described.

The first reason is to respond to changes in the production method of vehicles. As the conventional mass production in small variety changes to low-volume batch production, it becomes necessary to change the conventional monocoque and welding type to an assembly type. For the assembly type, in the case of the roof and upper body 10 of a vehicle, it is essential to be able to assemble various upper bodies 10 on a single underbody while ensuring structural performance such as collision and durability.

The second reason is to provide the internal space generated by the commercialization of electric vehicles. Vehicle buyers demand a relatively large internal space for a sense of openness, and in the case of electric vehicles, the absence of an engine allows for a reduction in the engine compartment space and frees up more internal space. Accordingly, even in a pillarless vehicle structure where B-pillar is absent and the sense of openness is ensured, it becomes necessary to ensure the strength of the vehicle roof module.

The reinforcing support portion 130 will be described below.

Figure 2:
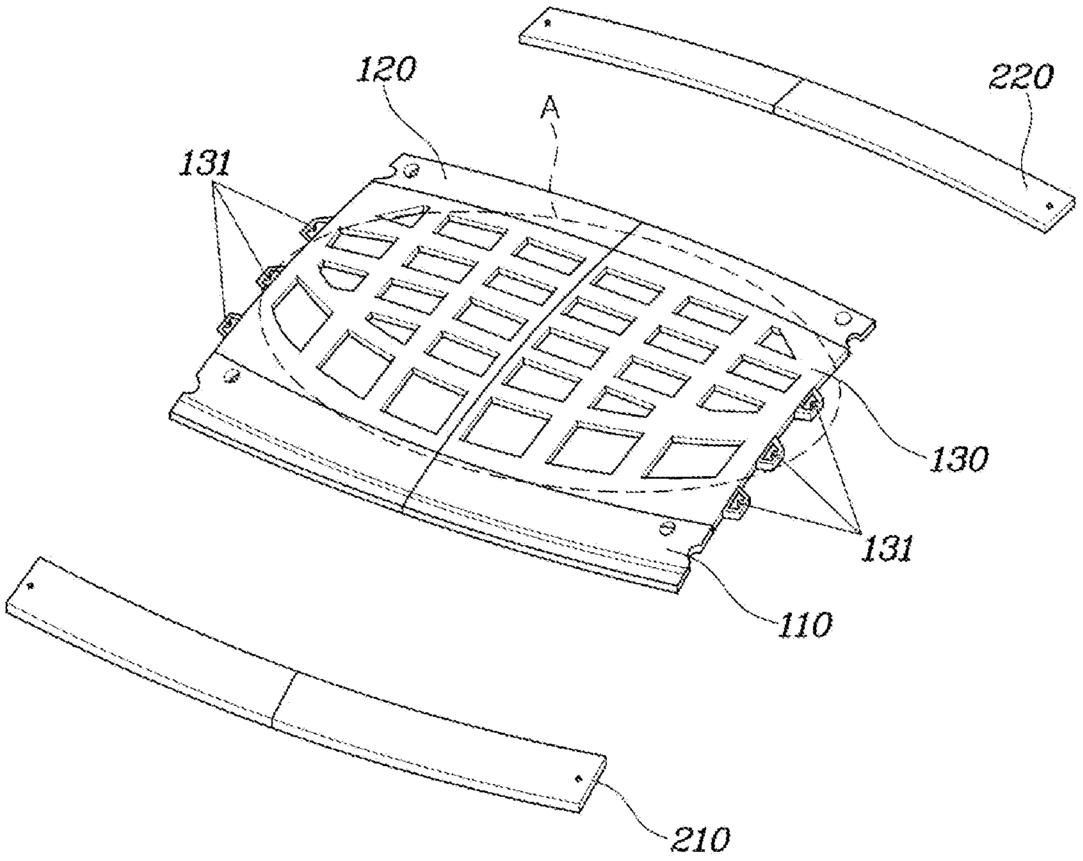
FIG. 2 is a view showing a configuration of a vehicle roof module according to various exemplary embodiments of the present disclosure.
Figure 3:
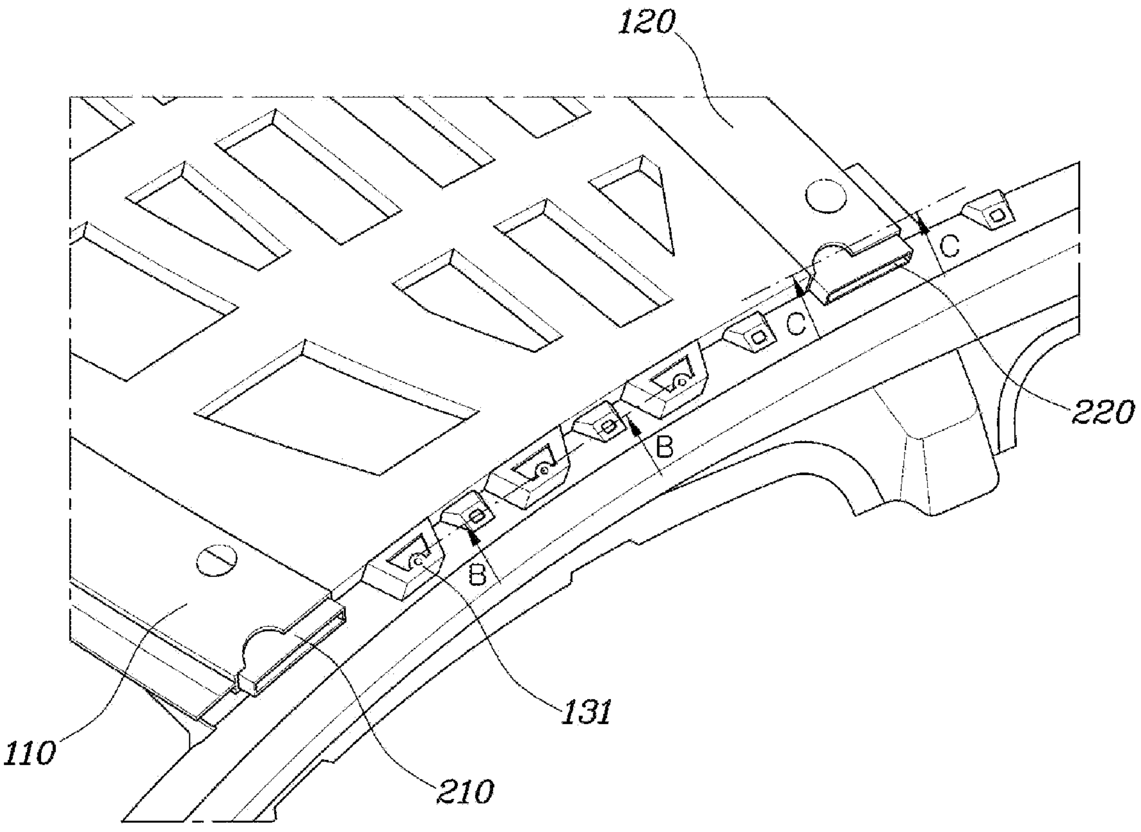
FIG. 3 is a view showing a portion in which an upper body and a reinforcing support portion are connected according to various exemplary embodiments of the present disclosure.

FIG. 2 is a view showing a configuration of a vehicle roof module according to various exemplary embodiments of the present disclosure. FIG. 3 is a view showing a portion in which the upper body 10 and the reinforcing support portion 130 are connected according to various exemplary embodiments of the present disclosure. FIG. 2 and FIG. 3 show that the reinforcing support portion 130 connects the front support portion 110 and the rear support portion 120 in the longitudinal direction of the vehicle and that an internal pattern such as a pattern A may be formed therein. The front support portion 110, the rear support portion 120, the reinforcing support portion 130, and the upper body 10 of the vehicle are connected to each other so that a load path for a vehicle collision may be formed along the internal pattern of the reinforcing support portion 130. The reinforcing support portion 130 includes a plurality of reinforcing ribs 140, and each reinforcing rib 140 includes a plurality of through holes arranged at predetermined intervals to form the internal pattern.

Each reinforcing rib 140 includes a plurality of through holes, having the effect of reducing the weight of the roof module. At the instant time, the plurality of reinforcing ribs 140 may be formed in a curved shape on one side to form a parabolic shape. As described above, this is to allow the load to be transferred to the side of the upper body 10 of the vehicle through the reinforcing rib 140 in the event of a vehicle collision.

In an exemplary embodiment of the present disclosure, the plurality of reinforcing ribs 140 include first ribs convexly-curved toward a front of the vehicle and second ribs convexly-curved toward a rear of the vehicle.

In an exemplary embodiment of the present disclosure, the front rail 210 and the rear rail 220 may include a plurality of reinforcing ribs 230, and each reinforcing rib includes a plurality of through holes arranged at predetermined intervals, as shown in FIG. 1. Some reinforcing ribs 240 of plurality of reinforcing ribs 230 may be formed in a curved shape on to form a parabolic shape. In an exemplary embodiment of the present disclosure, the plurality of reinforcing ribs 230 may include at least a first rib convexly-curved toward a front of the vehicle and at least a second rib convexly-curved toward a rear of the vehicle.

Furthermore, a plurality of mounting portions 131 may be formed to extend along the upper body 10 on the sides of the reinforcing support portion 130. The mounting portions 131 may be arranged at predetermined intervals from each other and may be formed so that a width of the mounting portion decreases toward an external side of the vehicle, which may ensure the stability of the mounting portions 131 in the up and down direction thereof. At the instant time, the interval between the mounting portions 131 may be set to approximately 140 to 200 mm, so that the roof module and the upper body 10 may be more securely coupled.

Figure 4:
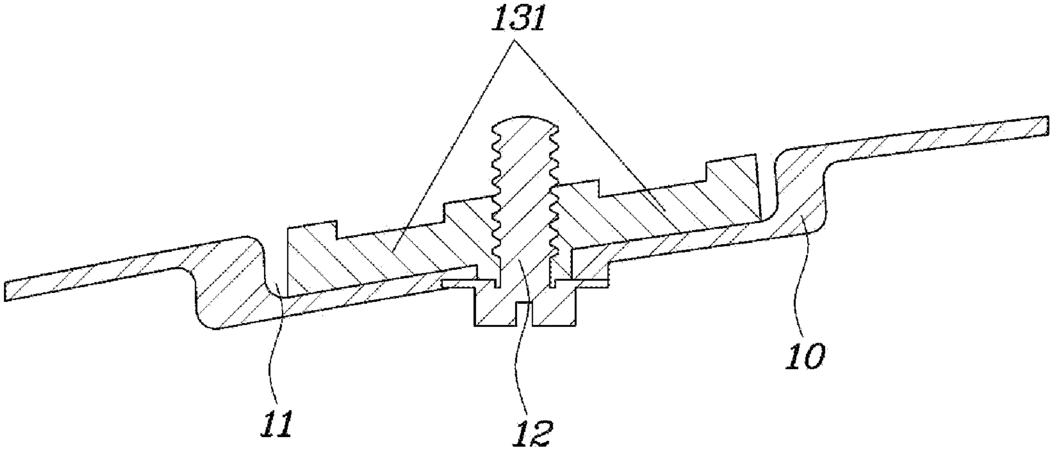
FIG. 4 is a view showing a cross-section taken along B-B in FIG. 3 according to various exemplary embodiments of the present disclosure.

FIG. 4 is a view showing a cross-section taken along B-B in FIG. 3 according to various exemplary embodiments of the present disclosure. FIG. 4 shows that the mounting portion 131 may be coupled to the upper body 10 of the vehicle by being bolted through a fastening bolt 12 in the up and down direction while being supported in a receiving groove 11. At the instant time, the upper body 10 is also configured in a form of a block structure so that the load of the vehicle may be securely supported. DIM'S may be secured through the assembly coupling of the mounting portion 131 and the upper body 10, and the step difference in the vehicle assembly may be kept constant. Furthermore, the entire block structure may be supported by use of a block-type square fastening structure rather than a usual hardware fastening method, which allows the mounting portion 131 to be coupled on three sides, transferring the load over a large area. Furthermore, an offset of 2 mm is applied in the front-and-rear direction of the vehicle to absorb manufacturing dispersion.

The mounting portion 131 will be described in detail with reference to FIG. 5.

Figure 5:
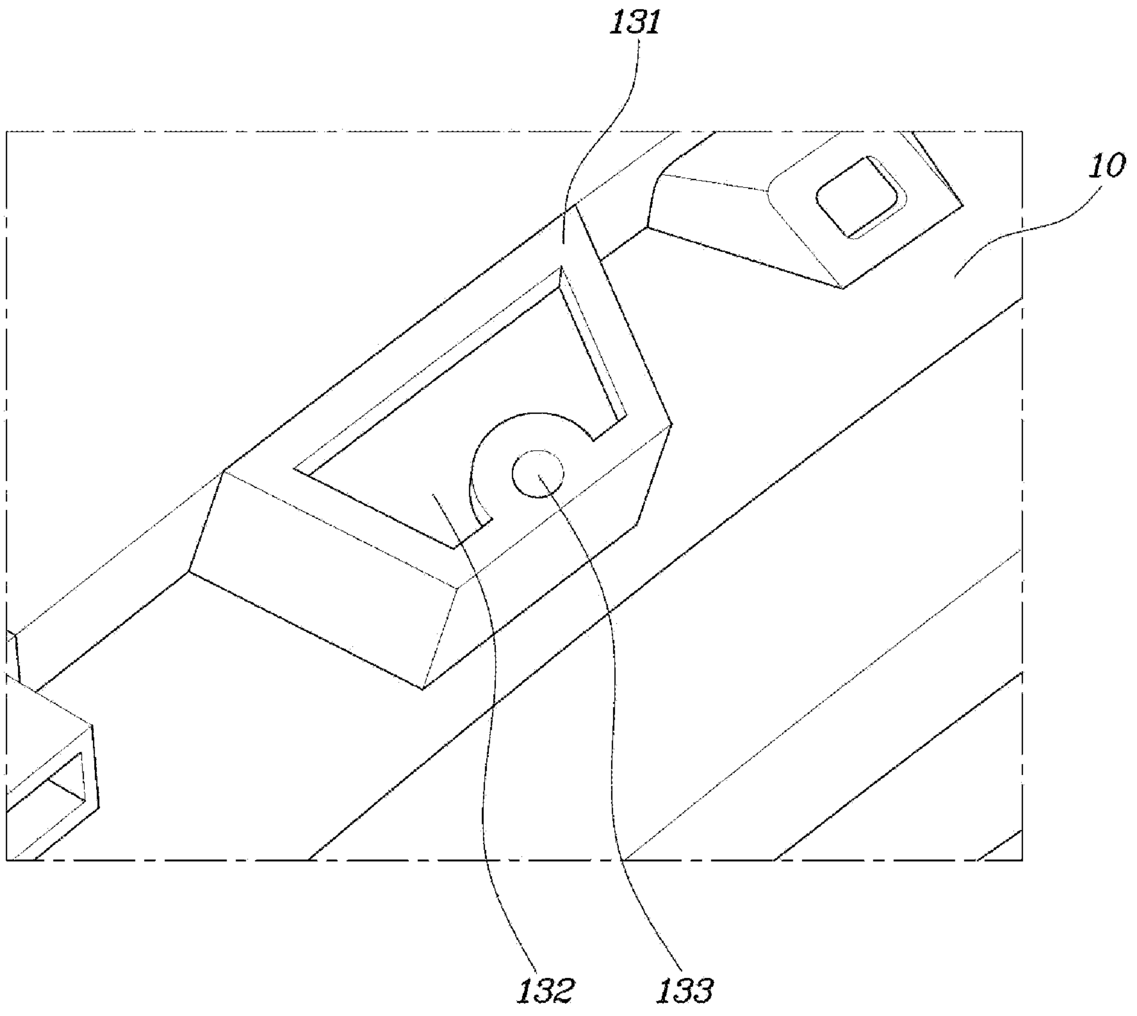
FIG. 5 is a view showing a mounting portion according to various exemplary embodiments of the present disclosure.

FIG. 5 is a view showing the mounting portion 131 according to various exemplary embodiments of the present disclosure. FIG. 5 shows that a fixing groove 132 and a fastening recess 133 may be formed in the mounting portion 131. The fixing groove 132 of the mounting portion 131 is formed in an inwardly recessed structure to facilitate the assembly with a roof panel in an installation structure. The downwardly recessed receiving groove 11 is formed on an upper surface of the upper body 10 so that the mounting portion 131 may be accommodated in the receiving groove 11 in a supported state. Furthermore, bolting to the upper body 10 by a fastener bolt 12 in the plastic fastening recess 133 may reduce the fracture rate at the connecting point. by use of the present method of bolting in the up and down direction, the structural strength may be maintained without breaking even when a significant load is applied to a bolting point such as when the vehicle is overturned.

Figure 6:
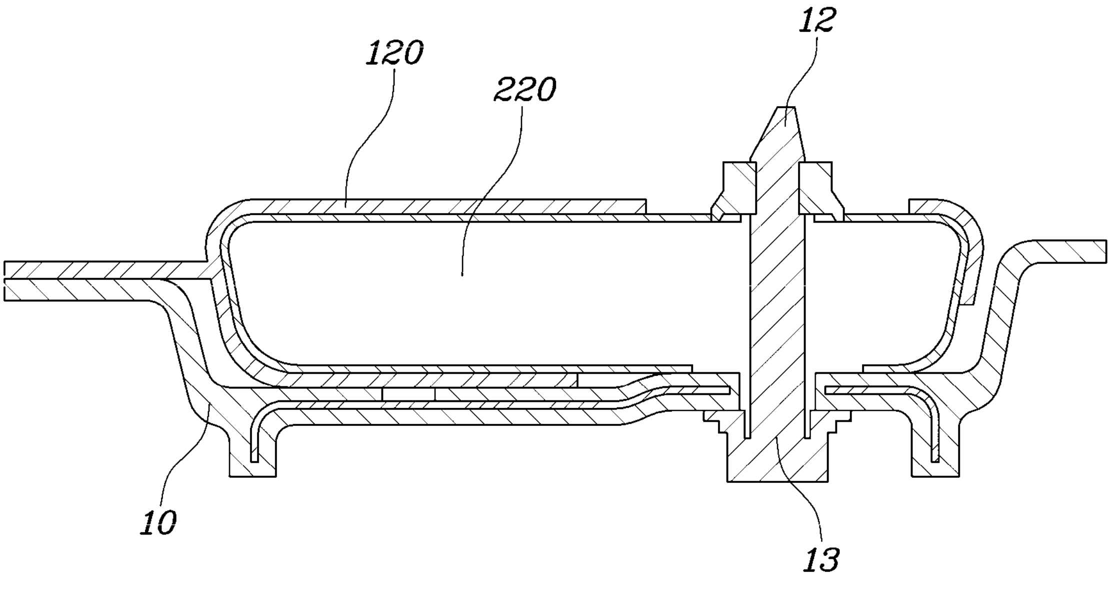
FIG. 6 is a view showing a cross-section taken along C-C in FIG. 3 according to various exemplary embodiments of the present disclosure.

FIG. 6 is a view showing a cross-section taken along C-C in FIG. 3 according to various exemplary embodiments of the present disclosure.

FIG. 6 shows that both end portions of the front rail 210 and the rear rail 220 may be bolted to the upper body 10 in the up and down direction while being inserted into the internal space of the front support portion 110 and the rear support portion 120, respectively. A weld nut 13 is pre-projection welded to be bolted to the upper body 10 so that the main strength of the roof may be supported. At the instant time, the rear rail 220 is fixed inside the rear support portion 120 by the structure in which the fastening bolt 12 is provided to penetrate both the upper surface and the lower surface of the rear rail 220 so that the overall strength of the roof module may be increased.

How much the load from a vehicle collision is distributed may vary depending on the internal pattern formed in the reinforcing support portion 130. Important considerations regarding vehicle collisions and regulations in the vehicle roof modules may be simplified into three factors: frontal collisions, side-impact collisions, and roof strength. First, the frontal collision of a vehicle will be described.

Figure 7:
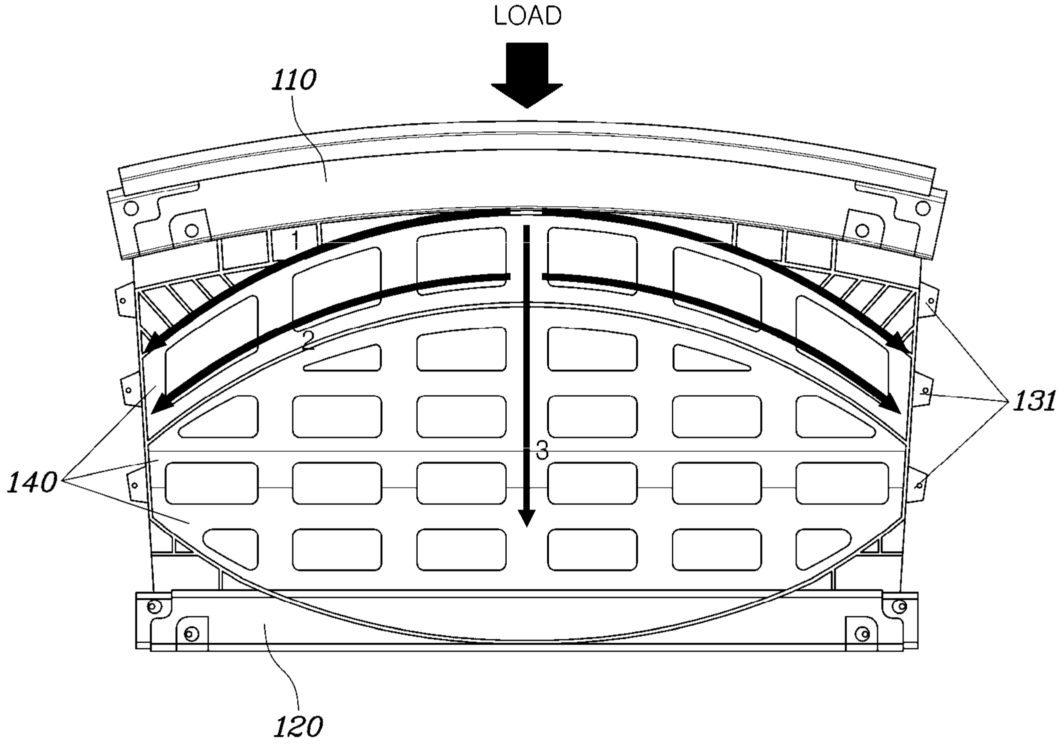
FIG. 7 is a view showing a load path of a load in the event of a frontal collision of a vehicle according to various exemplary embodiments of the present disclosure.

FIG. 7 is a view showing a load path of a load in the event of a frontal collision of a vehicle according to various exemplary embodiments of the present disclosure.

FIG. 7 shows that the reinforcing rib 140 may transfer the load from the front support portion 110 to the upper body 10 and the rear support portion 120 in the event of a frontal collision of the vehicle. First, in the event of a frontal collision, it is essential to apply an internal pattern that considers a high-speed collision, rather than an internal pattern including an ‘X’ or ‘+’ shape which is usually applied. In the event of a frontal collision of a vehicle, the load is transferred from the front of the vehicle to the side of the upper body 10 and the rear support portion 120 through the reinforcing rib 140. A plurality of reinforcing ribs 140 are provided so that the load is effectively transferred to each other between the reinforcing ribs 140.

Second, a side-impact collision of a vehicle will be described.

Figure 8:
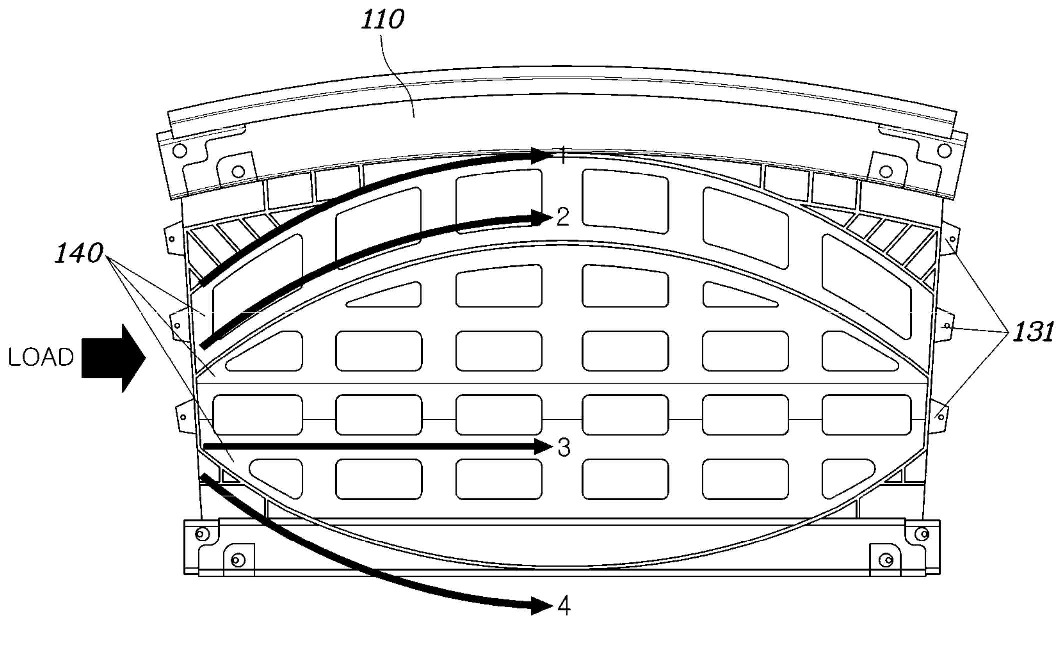
FIG. 8 is a view showing a load path of a load in the event of a side-impact collision of a vehicle according to various exemplary embodiments of the present disclosure.

FIG. 8 is a view showing a load path of a load in the event of a side-impact collision of a vehicle according to various exemplary embodiments of the present disclosure. FIG. 8 shows that, in the plurality of reinforcing ribs 140 can transmit a load from the upper body 10 on the other upper body 10 via the front support portion 110 and the rear support portion 120 in case of a side-impact collision of the vehicle. The load is transferred from the vehicle door, B pillar, and upper body 10 to the front rail 210 and the rear rail 220, which pass the reinforcing ribs 140 and serve as a main strength support structure of the upper body 10, in the event of a side-impact collision. The load transferred to the front rail 210 and the rear rail 220 is transferred to the other upper body 10 so that different load paths may be implemented.

Third, the roof strength of a vehicle will be described.

Figure 9:
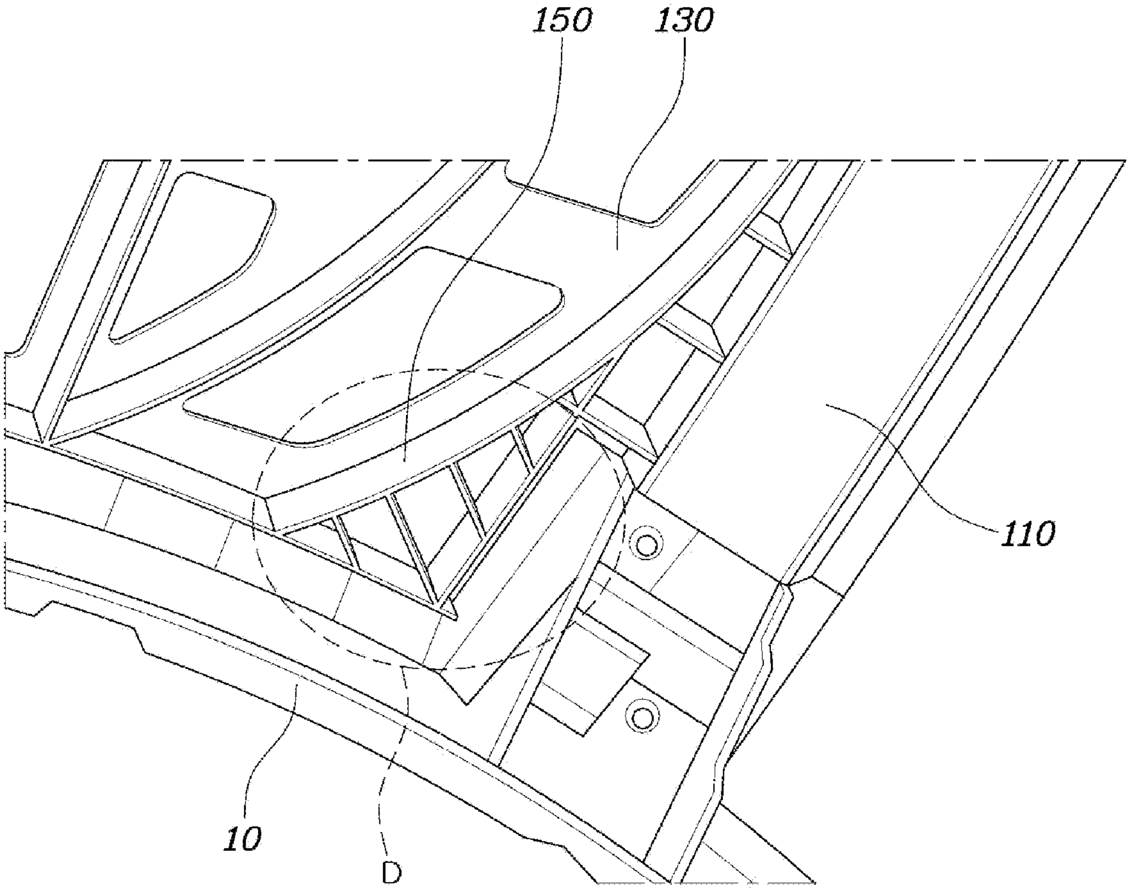
FIG. 9 is a view showing a support rib formed on a lower surface of a reinforcing support portion according to various exemplary embodiments of the present disclosure.

FIG. 9 is a view showing a support rib 150 formed on a lower surface of the reinforcing support portion 130 according to various exemplary embodiments of the present disclosure.

FIG. 9 shows that the support rib 150 may be formed on the lower surface of the reinforcing support portion 130. The most important things in the roof module are the roof strength test and the response structure for marketability. The roof strength test may be performed by applying a load several times the curb weight of the vehicle to the roof module and the upper body 10. The internal pattern of the reinforcing support portion 130 may evenly distribute the load to the front rail 210 and the rear rail 220 in the roof strength test, because a significant load is applied to the edge portion where the front rail 210 or the rear rail 220 is fastened, such as D region in FIG. 9, the overall strength of the roof module may be increased by arranging the separate support rib 150 in the diagonal direction thereof.

As a result, according to the vehicle roof module of the present disclosure, a more effective load path may be implemented by distributing the load from a vehicle collision through the internal pattern formed in the reinforcing support portion in the upper body structure of the vehicle, and the overall strength of the roof module may be increased by a unique method of coupling to the upper body.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In the present specification, unless stated otherwise, a singular expression includes a plural expression unless the context clearly indicates otherwise.

In exemplary embodiments of the present disclosure, “at least one of A and B” may refer to “at least one of A or B” or “at least one of combinations of one or more of A and B”. In addition, “one or more of A and B” may refer to “one or more of A or B” or “one or more of combinations of one or more of A and B”.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle roof module comprising:

a front support portion extending in a width direction of a vehicle and connecting upper bodies of the vehicle to each other;

a rear support portion extending in the width direction of the vehicle and provided at a rear of the front support portion;

a reinforcing support portion connecting the front support portion and the rear support portion in a longitudinal direction of the vehicle and including an internal pattern; and a front rail and a rear rail, wherein the front support portion, the rear support portion, the reinforcing support portion, and the upper bodies of the vehicle are connected to each other to form a load path for a vehicle collision along the internal pattern of the reinforcing support portion, wherein the front support portion and the rear support portion, respectively include an internal space, wherein the front rail is inserted into the internal space of the front support portion and extends in the width direction of the vehicle, wherein the rear rail is inserted into the internal space of the rear support portion and extends in the width direction of the vehicle, and wherein at least one of the front rail and the rear rail includes a plurality of reinforcing ribs, and each reinforcing rib includes a plurality of through holes arranged at predetermined intervals and adjacent to the reinforcing ribs.

2. The vehicle roof module of claim 1, wherein the front rail and the rear rail are coupled to the upper bodies in an up-and-down direction at first and second end portions of each of the front rail and the rear rail while being inserted into the internal spaces of the front support portion and the rear support portion, respectively.

3. The vehicle roof module of claim 1, wherein the front support portion, the rear support portion, and the reinforcing support portion are made of a first material, and the front rail and the rear rail are made of a second material, and wherein the first material and the second material are different from each other.

4. The vehicle roof module of claim 3, wherein the first material is a plastic and the second material is a steel.

5. The vehicle roof module of claim 1, wherein the plurality of reinforcing ribs include at least a first rib convexly-curved toward a front of the vehicle and at least a second rib convexly-curved toward the rear of the vehicle.

6. The vehicle roof module of claim 1, wherein the reinforcing support portion includes a mounting portion protruding laterally from the reinforcing support portion and is coupled to the upper bodies of the vehicle.

7. The vehicle roof module of claim 6, wherein a receiving groove recessed downward is formed on an upper surface of the upper bodies, and wherein the mounting portion is supported in the receiving groove.

8. The vehicle roof module of claim 7, wherein the mounting portion is coupled to the upper bodies of the vehicle by being bolted in an up-and-down direction while being supported in the receiving groove.

9. The vehicle roof module of claim 7, wherein a plurality of mounting portions are arranged along the upper bodies on sides of the reinforcing support portion at predetermined intervals therebetween.

10. The vehicle roof module of claim 7, wherein the mounting portion is formed so that a width of the mounting portion decreases toward an external side of the vehicle.

11. The vehicle roof module of claim 1, wherein the reinforcing support portion includes a plurality of reinforcing ribs, and wherein each reinforcing rib includes a plurality of through holes formed at predetermined intervals and adjacent to the reinforcing ribs to form the internal pattern.

12. The vehicle roof module of claim 11, wherein at least one of the plurality of reinforcing ribs is formed in a curved shape on one side thereof to form a parabolic shape.

13. The vehicle roof module of claim 11, wherein the plurality of reinforcing ribs include at least a first rib convexly-curved toward a front of the vehicle and at least a second rib convexly-curved toward the rear of the vehicle.

14. The vehicle roof module of claim 11, wherein the plurality of reinforcing ribs transfer loads from the front support portion to the upper bodies and the rear support portion in an event of a frontal collision of the vehicle collision.

15. The vehicle roof module of claim 11, wherein the plurality of reinforcing ribs transfers the loads from one upper body to another upper body via the front support portion and the rear support portion in an event of a side-impact collision of the vehicle collision.

16. The vehicle roof module of claim 1, wherein a support rib is formed on a lower surface of the reinforcing support portion, and wherein the support rib is disposed in a diagonal direction at a point where the front support portion and the upper bodies are connected.

17. A vehicle roof module comprising:

a vehicle roof module comprising:

a front support portion extending in a width direction of a vehicle and connecting upper bodies of the vehicle to each other;

a rear support portion extending in the width direction of the vehicle and provided at a rear of the front support portion; and a reinforcing support portion connecting the front support portion and the rear support portion in a longitudinal direction of the vehicle and including an internal pattern, wherein the front support portion, the rear support portion, the reinforcing support portion, and the upper bodies of the vehicle are connected to each other to form a load path for a vehicle collision along the internal pattern of the reinforcing support portion, wherein the reinforcing support portion includes a plurality of reinforcing ribs, wherein each reinforcing rib includes a plurality of through holes formed at predetermined intervals to form the internal pattern, and wherein at least one of the plurality of reinforcing ribs is formed in a curved shape on one side thereof to form a parabolic shape.

18. A vehicle roof module comprising:

a front support portion extending in a width direction of a vehicle and connecting upper bodies of the vehicle to each other;

a rear support portion extending in the width direction of the vehicle and provided at a rear of the front support portion; and a reinforcing support portion connecting the front support portion and the rear support portion in a longitudinal direction of the vehicle and including an internal pattern, wherein the front support portion, the rear support portion, the reinforcing support portion, and the upper bodies of the vehicle are connected to each other to form a load path for a vehicle collision along the internal pattern of the reinforcing support portion, wherein the reinforcing support portion includes a plurality of reinforcing ribs, wherein each reinforcing rib includes a plurality of through holes formed at predetermined intervals to form the internal pattern, and wherein the plurality of reinforcing ribs include at least a first rib convexly-curved toward a front of the vehicle and at least a second rib convexly-curved toward the rear of the vehicle.

* * * * *